United States Patent
Wu et al.

(10) Patent No.: US 12,503,462 B2
(45) Date of Patent: Dec. 23, 2025

(54) METHOD FOR PREPARING ISOXAZOLINE-CONTAINING URACIL COMPOUND THROUGH METHYLATION

(71) Applicants: SHENYANG SINOCHEM AGROCHEMICALS R&D CO., LTD., Liaoning (CN); JIANGSU YANGNONG CHEMICAL CO., LTD., Jiangsu (CN)

(72) Inventors: Enming Wu, Liaoning (CN); Yanming Ye, Liaoning (CN); Chunrui Yu, Liaoning (CN); Fuqiang Yu, Liaoning (CN); Youren Xue, Liaoning (CN); Jichun Yang, Liaoning (CN); Qiao Wu, Liaoning (CN); Liping Bai, Liaoning (CN); Aiying Guan, Liaoning (CN)

(73) Assignees: SHENYANG SINOCHEM AGROCHEMICALS R&D CO., LTD., Liaoning (CN); JIANGSU YANGNONG CHEMICAL CO., LTD., Jiangsu (CN)

( * ) Notice: Subject to any disclaimer, the term of this patent is extended or adjusted under 35 U.S.C. 154(b) by 791 days.

(21) Appl. No.: 17/281,219

(22) PCT Filed: Sep. 25, 2019

(86) PCT No.: PCT/CN2019/107666
§ 371 (c)(1),
(2) Date: Mar. 29, 2021

(87) PCT Pub. No.: WO2020/063613
PCT Pub. Date: Apr. 2, 2020

(65) Prior Publication Data
US 2021/0387974 A1 Dec. 16, 2021

(30) Foreign Application Priority Data

Sep. 29, 2018 (CN) .......................... 201811146442.1

(51) Int. Cl.
*C07D 413/10* (2006.01)
(52) U.S. Cl.
CPC .................. *C07D 413/10* (2013.01)
(58) Field of Classification Search
CPC .................................................. C07D 413/10
See application file for complete search history.

(56) References Cited

U.S. PATENT DOCUMENTS

| 5,705,648 A * | 1/1998 | Clark ................. C07D 295/037 |
| | | 546/349 |
| 6,992,044 B1 * | 1/2006 | Andree ................ C07D 413/10 |
| | | 544/55 |
| 10,550,111 B2 * | 2/2020 | Liu ........................ C07D 413/10 |

FOREIGN PATENT DOCUMENTS

| CN | 105753853 A | 7/2016 |
| WO | 2016095768 A1 | 6/2016 |

OTHER PUBLICATIONS

Loudon "Organic Chemistry" 3rd edition, Addison-Wesley: 1995, p. 403.*
Zhachkina, A. et al. "Uracil and Thymine Reactivity in the Gas Phase: The SN2 Reaction and Implications for Electron Delocalization in Leaving Groups"; Journal of the American Chemical Society, vol. 131, No. 51, Nov. 24, 2009, pp. 18376-18385.
Eguchi, Y. et al. "Studies on hypotensive agents. synthesis of 1-substituted 3-(2-chlorophenyl)-6-ethoxycarbony 1-5, 7-dimethyl-2,4-(1H,3H)-quinazolinediones" Chemical & Pharmaceutical Bulletin, vol. 39, No. 7, Jul. 31, 1991, pp. 1753-1759.

* cited by examiner

*Primary Examiner* — David K O'Dell
(74) *Attorney, Agent, or Firm* — NKL Law; Allen Xue

(57) ABSTRACT

A method for preparing an isoxazoline-containing uracil compound involves methylation. An isoxazoline-containing uracil compound shown by formula I is prepared by a methylation reaction between a compound shown by formula II and methyl chloride in a closed container in the presence of alkali, a catalyst and an organic solvent; and a reaction equation is as follows:

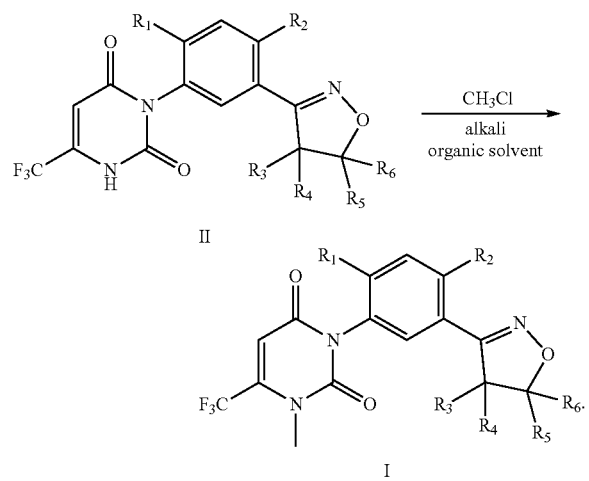

6 Claims, No Drawings

METHOD FOR PREPARING ISOXAZOLINE-CONTAINING URACIL COMPOUND THROUGH METHYLATION

TECHNICAL FIELD

The present invention belongs to the field of organic synthesis, and particularly relates to a method for preparing an isoxazoline-containing uracil compound through methylation.

BACKGROUND

The compound in the general formula I is a kind of compound which has excellent herbicidal activity and can effectively control weeds such as barnyard grass, green bristlegrass, difformed galingale herb, *Juncellus serotinus*, crabgrass, *Arthraxon*, piemarker, *Zinnia*, *Amaranthus retroflexus*, purslane, cocklebur, *Solanum nigrum, Cassia, Hibiscus trionum* and *Glycine ussuriensis*, can obtain good herbicidal effect at low dose and can be agriculturally used as a herbicide.

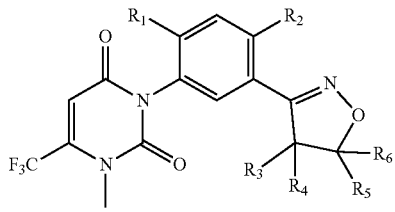

I

Patent WO2016095768 discloses a synthesis method of the compound. The method has the following disadvantages in the use of iodomethane: firstly, the iodomethane has a low boiling point, strong volatility and high toxicity, and is extremely easy to escape in the use process and hurt people; secondly, the iodomethane is expensive, and causes high production cost if used in large scale; thirdly, iodine-containing waste water causes serious pollution, and an iodine recovery process is complicated, which increases the cost invisibly; fourthly, the iodomethane is difficult to be replaced by other methylation reagents; especially when the part compound shown by formula I is an oily matter at room temperature, and cannot obtain a high-content product by means of recrystallization or rectification, the compound needs to be purified by column chromatography that is difficult to achieve in industrial production. Therefore, a method for preparing an isoxazoline-containing uracil compound through methylation, which can avoid using the iodomethane, avoid the column chromatography operation that is difficult to achieve in the industrial production and obtain the high-content product at one time, is required. To overcome the defects in the prior art, the present invention provides a method for preparing an isoxazoline-containing uracil compound through methylation.

SUMMARY

The purpose of the present invention is to provide a method for preparing an isoxazoline-containing uracil compound through methylation.

To achieve the above purpose, the present invention adopts the following technical solution:

A method for preparing an isoxazoline-containing uracil compound through methylation is provided; an isoxazoline-containing uracil compound shown by formula I is prepared by a methylation reaction of a compound shown by formula II with methyl chloride in a closed container in the presence of alkali, a catalyst and an organic solvent; and a reaction equation is as follows:

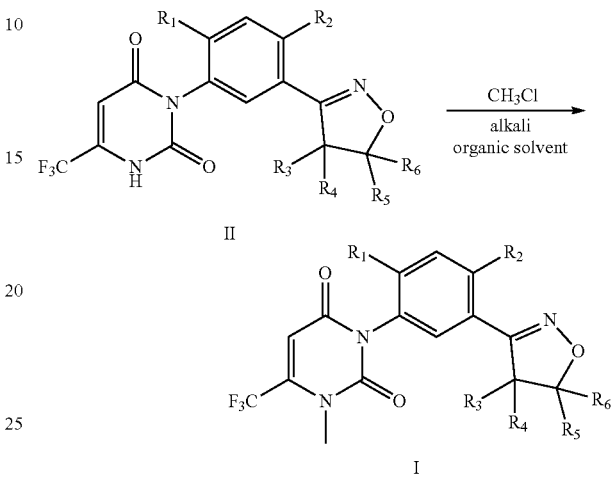

wherein variables are defined as follows:
$R_1$ and $R_2$ can be the same or different, and are respectively selected from hydrogen, fluorine or chlorine;
$R_3$ is selected from hydrogen or $C_1$-$C_4$ alkyl;
$R_4$ is selected from hydrogen, $C_1$-$C_4$ alkyl, $CO_2R_7$ or $CH_2OR_8$;
$R_5$ is selected from hydrogen, cyan, $C_1$-$C_4$ alkyl, $C_1$-$C_4$ haloalkyl, $CO_2R_7$ or $CH_2OR_8$
$R_6$ is selected from hydrogen, $C_1$-$C_4$ alkyl or $C_1$-$C_4$ haloalkyl;
$R_7$ is selected from hydrogen, $C_1$-$C_4$ alkyl or $C_1$-$C_4$ haloalkyl;
$R_8$ is selected from hydrogen, $C_1$-$C_4$ alkyl, $C_1$-$C_4$ haloalkyl or $C_1$-$C_4$ alkylcarbonyl.

Further, an isoxazoline-containing uracil compound shown by formula I is prepared by a methylation reaction of a compound shown by formula II with methyl chloride in a closed container with reaction pressure of 0-2.0 MPa and temperature of 20-140° C. in the presence of alkali, a catalyst and an organic solvent.

After the methylation reaction, the temperature is reduced to room temperature; water is added for washing and layering; an organic layer is washed with the water, filtered, decompressed and desolventized to obtain an oily matter, i.e., the isoxazoline-containing uracil compound shown by the formula I.

The alkali is alkali metal hydroxide, carbonate of alkali metal, or bicarbonate of alkali metal, wherein the molar ratio of the alkali to the compound shown by the formula II is 0.5:1-4:1.

The alkali is sodium hydroxide, potassium hydroxide, potassium carbonate, sodium carbonate, cesium carbonate, potassium bicarbonate, sodium bicarbonate or cesium bicarbonate, wherein the molar ratio of the alkali to the compound shown by the formula II is 0.5:1-2:1.

The catalyst is sodium iodide, potassium iodide, triethylamine, N,N-diisopropylethylamine, 1,8-diazabicycloundec-7-ene, 1,4-diazabicyclo[2.2.2]octane, 1-azabicyclo[2.2.2]octane, 4-dimethylaminopyridine, indolizine, quinoline or pyridine, wherein the dosage of the catalyst is 1%-10% of the weight of the compound shown by the formula II.

The organic solvent is one or a mixture of more of aromatic hydrocarbon, halogenated aromatic hydrocarbon, ester, ketone, ether, alkane, haloalkane, N,N-dimethylformamide, dimethyl sulfoxide, N-methylpyrrolidone, acetonitrile and pyridine, wherein the dosage of the organic solvent is 2-20 times of the weight of the compound shown by the formula I.

The organic solvent is one or a mixture of more of toluene, xylene, chlorobenzene, ethyl acetate, propyl acetate, isopropyl acetate, methyl acetate, methyl isobutyl ketone, n-hexane, cyclohexane, 2-methylpentane, 3-methylpentane, n-heptane, dichloromethane, 1,2-dichloroethane and chloroform, wherein the dosage of the organic solvent is 3-10 times of the weight of the compound shown by the formula II.

The methyl chloride enters the closed container in a gaseous or liquid form; and the molar ratio of the addition amount of the methyl chloride to the compound shown by the formula II is 1:1-1:40.

The methylation reaction is conducted in the closed container. The closed container is generally a reactor which has a feed inlet, a discharge port, a stirring device, a temperature measurement device and a pressure measurement device and can withstand certain pressure. The methyl chloride enters the closed reactor in a gaseous or liquid form; and the molar ratio of the addition amount to the compound II is 1:1-1:40. To effectively control the addition amount of the methyl chloride, a metering tank can be added for more accurate metering before the methyl chloride enters the reactor, or a methyl chloride storage tank can also be weighed and metered. In order to better dissolve the methyl chloride in the liquid phase material, the methyl chloride enters the reactor from a position below a liquid level of the liquid phase materials.

The preparation method of the compound shown by the formula II is described in patent WO2016095768.

In the compounds of the general formulas (I and II) given above, the used terms are generally defined as follows: alkyl is in a linear or branched form, such as methyl, ethyl, n-propyl, isopropyl, n-butyl and isobutyl. Haloalkyl: linear or branched alkyl on which hydrogen atoms can be partially or fully replaced by halogen atoms, such as chloromethyl, dichloromethyl, trichloromethyl, fluoromethyl, difluoromethyl and trifluoromethyl. Alkylcarbonyl: alkyl, connected to the structure through carbonyl, such as $CH_3CO—$ or $CH_3CH_2CO—$.

The present invention has the advantages: highly toxic and expensive chemical iodomethane is not used as raw material, thereby avoiding personal injury that may be caused in the use process, cost disadvantage caused by too high price and environmental protection problems caused by waste water. Especially when the isoxazoline-containing uracil part compound shown by formula I is an oily matter at room temperature, is low in the content and cannot be purified, product registration and preparation processing may be seriously disturbed. A high-content product can be obtained by the synthesis method of the present invention without the need of purification, and can satisfy the requirements of product registration and preparation processing for the content of original medicine.

DETAILED DESCRIPTION

The method for preparing an isoxazoline-containing uracil compound shown by formula I through methylation is further described in detail below by illustrating embodiments. However, the present invention is not limited to the embodiments.

Embodiment 1 Synthesis of Compound I-1

46.4 g (0.1 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid ethyl ester, 6.4 g (0.06 mol) of sodium carbonate, 200 g of toluene and 2.5 g of 1,8-diazabicycloundec-7-ene are added to an autoclave; an autoclave cover is covered; 11.0 g of methyl chloride is metered and introduced; stirring is conducted and the temperature is increased to 95-105° C.; and when the pressure gage shows 0.8 MPa, the reaction is conducted for 10 hours. The temperature is reduced to 20° C.; the pressure in the autoclave is relieved; and excessive methyl chloride is recovered. 50 g of water is added to the autoclave and stirred for 10 minutes. After stirring, the mixture is layered to remove a water layer; an organic layer is filtered to remove a small amount of insolubles; and the organic phase is removed off under reduced pressure to obtain 49.0 g of oily matter. The quantitative content is 92.7% and the yield is 95.0%.

Embodiment 2 Synthesis of Compound I-2

45.0 g (0.1 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid methyl ester, 6.4 g (0.06 mol) of sodium carbonate, 200 g of ethyl acetate and 2.6 g of 1,4-diazabicyclo[2.2.2]octane are added to an autoclave; 20.2 g of methyl chloride is metered and introduced; stirring is conducted and the temperature is increased to 95-105° C.; and when the pressure gage shows 0.9 MPa, the reaction is conducted for 11 hours. The temperature is reduced to 20° C.; the pressure in the autoclave is relieved; and excessive methyl chloride is recovered. 50 g of water is added to the autoclave and stirred for 10 minutes. After stirring, the mixture is layered to remove a water layer; an organic layer is washed with 50 g of water, and is filtered to remove a small amount of insolubles; and the organic phase is removed off under reduced pressure to obtain 48.9 g of oily matter. The quantitative content is 97.0% and the yield is 99.2%.

Embodiment 3 Synthesis of Compound I-3

33.4 g (0.07 mol) of (3-(2-chloro-5-(2,6-dioxo-4-trifluoromethyl-3,6-dihydropyrimidin-1(2H)-yl)-4-fluorophenyl)-5-methyl-4,5-dihydroisoxazole-5-yl)methyl acetate, 7.10 g (0.084 mol) of sodium bicarbonate, 150 g of dichloromethane and 3.0 g of 1-azabicyclo[2.2.2]octane are added to an autoclave; 5.0 g of methyl chloride is metered and introduced; stirring is conducted and the temperature is increased to 70-80° C.; and when the pressure gage shows 0.4 MPa, the reaction is conducted for 21 hours. The temperature is reduced to 20° C.; the pressure in the autoclave is relieved; and excessive methyl chloride is recovered. 40 g of water is added to the autoclave and stirred for 10 minutes. After stirring, the mixture is layered to remove a water layer; an organic layer is washed with 50 g of water, and is filtered to remove a small amount of insolubles; and the organic phase is removed off under reduced pressure to obtain 48.3 g of oily matter. The quantitative content is 93.1% and the yield is 94.1%.

Embodiment 4 Synthesis of Compound I-4

46.8 g (0.08 mol) of 3-(2-chloro-5-(2,6-dioxo-4-trifluoromethyl-3,6-dihydropyrimidin-1(2H)-yl)-phenyl)-5-methyl-4,5-di hydroisoxazole-5-methyl acetate, 6.6 g (0.048 mol) of potassium carbonate, 200 g of chlorobenzene and 2.6 g of 1,4-diazabicyclo[2.2.2]octane are added to an autoclave; 33.3 g of methyl chloride is introduced; stirring is conducted and the temperature is increased to 90-100° C.; and when the pressure gage shows 0.7 MPa, the reaction is conducted for 15 hours. The temperature is reduced to 20° C.; the pressure in the autoclave is relieved; and excessive methyl chloride is recovered. 50 g of water is added to the autoclave and stirred for 10 minutes. After stirring, the mixture is layered to remove a water layer; an organic layer is washed with 50 g of water, and is filtered to remove a small amount of insolubles; and the organic phase is removed off under reduced pressure to obtain 49.0 g of oily matter. The quantitative content is 92.3% and the yield is 94.6%.

Reference Example 1 Synthesis of Compound I-1

46.4 g (0.1 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid ethyl ester, 6.4 g (0.06 mol) of sodium carbonate, 200 g of toluene and 2.5 g of 1,8-diazabicycloundec-7-ene are added to a four-neck flask with a thermometer, a condenser, a stirrer and a bottom inserting pipe; the temperature is increased to 85° C.; methyl chloride gas is continuously introduced at 85-90° C. and the process is tracked until the raw materials are completely consumed. The temperature is reduced to 20° C. Nitrogen bubbles to blow off residual gas. 50 g of water is added to the flask and stirred for 10 minutes. After stirring, the mixture is layered to remove a water layer; an organic layer is filtered to remove a small amount of insolubles; and the organic phase is removed off under reduced pressure to obtain 50.4 g of oily matter. The quantitative content is 62.7% and the yield is 66.1%.

Reference Example 2 Synthesis of Compound I-2

36.0 g (0.08 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid methyl ester, 5.1 g (0.048 mol) of sodium carbonate and 160 g of ethyl acetate are added to an autoclave; 18.2 g of methyl chloride is metered and introduced; stirring is conducted and the temperature is increased to 95-105° C.; and when the pressure gage shows 0.9 MPa, the reaction is conducted for 11 hours. The temperature is reduced to 20° C.; the pressure in the autoclave is relieved; and excessive methyl chloride is recovered. 50 g of water is added to the autoclave and stirred for 10 minutes. After stirring, the mixture is layered to remove a water layer; an organic layer is washed with 50 g of water, and is filtered to remove a small amount of insolubles; and the organic phase is removed off under reduced pressure to obtain 38.3 g of oily matter. The quantitative content is 89.8% and the yield is 92.6%.

Reference Example 3 Synthesis of Compound I-1

46.4 g (0.1 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid ethyl ester, 10.7 g (0.1 mol) of sodium carbonate, 200 g of toluene and 19.1 g (0.15 mol) of dimethyl sulfate are added to a reaction flask, and react at 70-75° C. for 4-5 hours. HPLC tracks pyrimidine until the pyrimidine is less than or equal to 0.5%; the temperature is reduced to 50° C.; and about 100 g of water is added to preserve the temperature at 50° C. for 1 hour. After that, the material is layered to remove a water layer; 50 g of water is added to an organic layer; the pH is regulated with 3-5% of dilute hydrochloric acid to 6-7; and after the water layer is separated, 50 g of water is used for washing. The organic layer is filtered to remove a small amount of insolubles; and the mixture is removed off under reduced pressure to obtain 50.7 g of oily matter. The quantitative content is 84.8% and the yield is 90%.

Reference Example 4 Synthesis of Compound I-1 (WO2016095768)

14 g (0.031 mol) of 3-(2-chloro-5-(2,6-dioxo-4-trifluoromethyl-3,6-dihydropyrimidin-1(2H)-yl)-4-fluorophenyl)-5-methyl-4,5-dihydroisoxazole-5-carboxylic acid ethyl ester and 12.9 g (0.094 mol) of potassium carbonate are successively added to a reaction flask containing 150 ml of N,N-dimethylformamide, and cooled to 0° C.; 8.9 g (0.062 mol) of iodomethane is added dropwise; and then the material is heated to room temperature and stirred to react for 6 hours. The TLC completely monitors the reaction. The reaction mixture is poured into the water, extracted with ethyl acetate, washed with saturated salt, dried with organic phase anhydrous magnesium sulfate, and subjected to vacuum distillation to obtain 14.3 g of oily matter. The quantitative content is 92.1% and the yield is 89%.

According to the modes described in embodiments 1, 2, 3 and 4, the specific structures of part of the compounds in the general formula I are as follows:

| No. | Structure | Nuclear Magnetic Data ($^1$HNMR, 300 MHz, internal standard TMS, solvent $CDCl_3$) |
|---|---|---|
| I-1 | [structure of compound I-1] | 1.35(t, 3H), 1.68(s, 3H), 3.38(d, 1H), 3.60(s, 3H), 3.90(d, 1H), 4.30(m, 2H), 6.25(s, 1H), 7.38(d, 1H), 7.79(d, 1H) |

-continued

| No. | Structure | Nuclear Magnetic Data ($^1$HNMR, 300 MHz, internal standard TMS, solvent CDCl$_3$) |
|---|---|---|
| I-2 | (structure) | 1.70(s, 3H), 3.38(d, 1H), 3.56(s, 3H), 3.99(d, 1H), 4.32(s, 3H), 6.36(s, 1H), 7.36(d, 1H), 7.69(d, 1H) |
| I-3 | (structure) | 1.41(s, 3H), 2.03(s, 3H), 3.25(d, 1H), 3.50(d, 1H), 3.62(s, 3H), 3.88(m, 2H), 6.22(s, 1H), 7.51(d, 1H), 7.69(d, 1H) |
| I-4 | (structure) | 1.48(s, 3H), 2.07(s, 3H), 2.85(d, 1H), 3.26(d, 1H), 3.52(s, 3H), 4.15(m, 2H), 6.34(s, 1H), 7.18(m, 1H), 7.56(m, 2H) |

We claim:

1. A method for preparing an isoxazoline-containing uracil compound of formula I, comprising:

reacting methyl chloride with a compound of formula II in an organic solvent in the presence of an alkali and a catalyst in a sealed container to obtain a reaction mixture containing the isoxazoline-containing uracil compound of formula I:

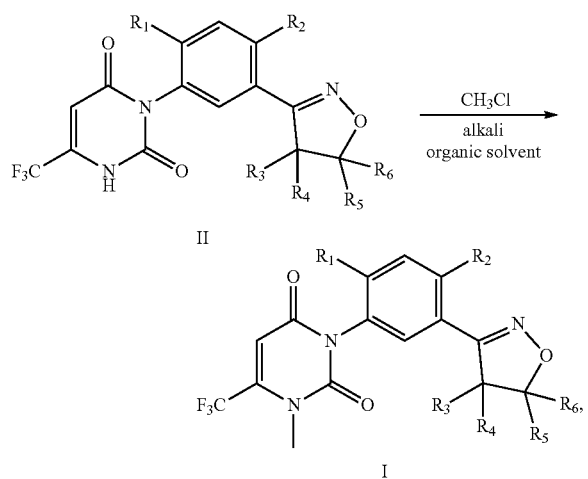

wherein the reaction is carried out at a reaction pressure of 0.4-0.9 MPa and a reaction temperature of 70-105° C.;

adding water to the reaction mixture to obtain an aqueous layer and an organic layer;

separating the aqueous layer from the organic layer;

filtering the organic layer to obtain an organic liquid; and subjecting the organic liquid to vacuum distillation to obtain an oily matter containing the compound of formula I, wherein:

a yield of the compound of formula I is at least 94.1%, $R_1$ and $R_2$ are the same or different, and independently selected from hydrogen, fluorine, and chlorine;

$R_3$ is hydrogen or $C_1$-$C_4$ alkyl;

$R_4$ is hydrogen or $C_1$-$C_4$ alkyl;

$R_5$ is $CO_2R_7$;

$R_6$ is hydrogen or $C_1$-$C_4$ alkyl;

$R_7$ is selected from hydrogen or $C_1$-$C_4$ alkyl, the catalyst is 1,8-diazabicycloundec-7-ene, 1,4-diazabicyclo[2.2.2]octane, or 1-azabicyclo[2.2.2]octane, and an amount of the catalyst is 1%-10% of the weight of the compound of formula II, the alkali is alkali metal hydroxide, carbonate of alkali metal, or bicarbonate of alkali metal, and a molar ratio of anions in the alkali to the compound of formula II is 0.5:1-4:1, and the method does not comprise a further purification step selected from chromatographic column separation.

2. The method according to claim 1, wherein the alkali is sodium hydroxide, potassium hydroxide, potassium carbonate, sodium carbonate, cesium carbonate, potassium bicarbonate, sodium bicarbonate, or cesium bicarbonate, and the molar ratio of anions in the alkali to the compound of formula II is 0.5:1-2:1.

3. The method according to claim 1, wherein the organic solvent is selected from aromatic hydrocarbon, halogenated aromatic hydrocarbon, ester, ketone, ether, alkane, haloalkane, N,N-dimethylformamide, dimethyl sulfoxide, N-methylpyrrolidone, acetonitrile, pyridine, and a mixture thereof, and an amount of the organic solvent is 2-20 times of the weight of the compound of formula I.

4. The method according to claim 3, wherein the organic solvent is selected from toluene, xylene, chlorobenzene, ethyl acetate, propyl acetate, isopropyl acetate, methyl acetate, methyl isobutyl ketone, n-hexane, cyclohexane, 2-methylpentane, 3-methylpentane, n-heptane, dichloromethane, 1,2-dichloroethane, chloroform, and a mixture thereof, and the amount of the organic solvent is 3-10 times of the weight of the compound shown by the formula II.

5. The method according to claim 1, wherein methyl chloride in the sealed container in a gaseous form or in a liquid form; and a molar ratio of methyl chloride to the compound of formula II is 1:1-1:40.

6. The method according to claim 1, wherein in $R_1$ and $R_2$ are both H.

* * * * *